United States Patent
Ren (10) Patent No.: US 10,925,096 B2
(45) Date of Patent: Feb. 16, 2021

(54) EXTENDED RANDOM ACCESS METHOD USED BY UE AND BASE STATION AND RELATED APPARATUSES USING THE SAME

(71) Applicant: Industrial Technology Research Institute, Hsinchu (TW)

(72) Inventor: Fang-Ching Ren, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 16/390,021

(22) Filed: Apr. 22, 2019

(65) Prior Publication Data
US 2020/0337089 A1 Oct. 22, 2020

(51) Int. Cl.
H04W 4/00 (2018.01)
H04W 74/08 (2009.01)
H04W 52/36 (2009.01)
H04L 1/18 (2006.01)

(52) U.S. Cl.
CPC ....... *H04W 74/0833* (2013.01); *H04L 1/1861* (2013.01); *H04W 52/365* (2013.01)

(58) Field of Classification Search
CPC ............ H04W 74/0833; H04W 52/365; H04L 1/1861
USPC ........................................................ 370/329
See application file for complete search history.

(56) References Cited

U.S. PATENT DOCUMENTS

| | | | |
|---|---|---|---|
| 9,635,652 | B2 | 4/2017 | Wu |
| 2014/0233538 | A1* | 8/2014 | Zhang ............... H04W 72/1205 370/336 |
| 2015/0023281 | A1* | 1/2015 | Wu ................... H04W 72/0473 370/329 |
| 2017/0188352 | A1 | 6/2017 | Lee et al. |
| 2017/0231011 | A1 | 8/2017 | Park et al. |
| 2018/0176000 | A1* | 6/2018 | Lee ....................... H04L 1/1822 |

(Continued)

FOREIGN PATENT DOCUMENTS

| | | |
|---|---|---|
| CN | 103249169 | 8/2013 |
| CN | 104205670 | 12/2014 |

(Continued)

OTHER PUBLICATIONS

Huawei, Hisilicon, "Way Forward on early data transmission in RACH for NB-IoT," 3GPP TSG RAN WG1 Meeting #91, Dec. 2017, pp. 1-3.

(Continued)

*Primary Examiner* — Mang Hang Yeung
(74) *Attorney, Agent, or Firm* — JCIPRNET (57) ABSTRACT

The disclosure is directed to an extended RA method used by a UE and by a base station and related apparatuses using the same method. In an aspect, the disclosure is directed to an extended RA method used by a UE. The method includes not limited to transmitting a random access preamble (RAP); receiving a random access response (RAR) which responds to the RAP; transmitting an RA request signal which corresponds to the RAR and includes a first small data and a piggyback indicator which indicates whether there is a second small data to be transmitted; and receiving an RA request acknowledgment signal which corresponds to the RA request signal and comprises an uplink grant which indicates a resource for the second small data.

14 Claims, 8 Drawing Sheets

(56) References Cited

U.S. PATENT DOCUMENTS

| | | | |
|---|---|---|---|
| 2018/0184439 A1* | 6/2018 | Lee | H04W 72/0413 |
| 2019/0141753 A1* | 5/2019 | Lin | H04W 76/27 |
| 2019/0335515 A1* | 10/2019 | Chen | H04W 76/18 |

FOREIGN PATENT DOCUMENTS

| | | |
|---|---|---|
| TW | I539792 | 6/2016 |
| WO | 2012150809 | 11/2012 |
| WO | 2017052144 | 3/2017 |

OTHER PUBLICATIONS

Huawei, Hisilicon, "On early data transmission for eFeMTC," 3GPP TSG RAN WG1 Meeting #90bis, Oct. 2017, pp. 1-3.

Ericsson, "Early data transmission for MTC," 3GPP TSG-RAN WG1 Meeting #90bis, Oct. 2017, pp. 1-4.

ZTE, "On early data transmission for eMTC," 3GPP TSG RAN WG1 Meeting #90bis, Oct. 2017, pp. 1-4.

Nokia, Nokia Shanghai Bell, "Data transmission during random access procedure," 3GPP TSG RAN WG1 Meeting #90bis, Oct. 2017, pp. 1-3.

LG Electronics, "Data transmission during random access procedure in MTC," 3GPP TSG RAN WG1 Meeting #90bis, Oct. 2017, pp. 1-3.

Samsung, "Early data transmission for eMTC," 3GPP TSG RAN WG1 Meeting #90bis, Oct. 2017, pp. 1-3.

Intel Corporation, "Early data transmission for efeMTC," 3GPP TSG RAN WG1 Meeting #90bis, Oct. 2017, pp. 1-3.

"Notice of Allowance of Taiwan Counterpart Application," dated Apr. 30, 2020, p. 1-p. 4.

* cited by examiner

FIG. 11

EXTENDED RANDOM ACCESS METHOD USED BY UE AND BASE STATION AND RELATED APPARATUSES USING THE SAME

TECHNICAL FIELD

The present disclosure is directed to an extended random access method used by a user equipment (UE) and a base station, and related apparatuses using the same method.

BACKGROUND

Figure 1:
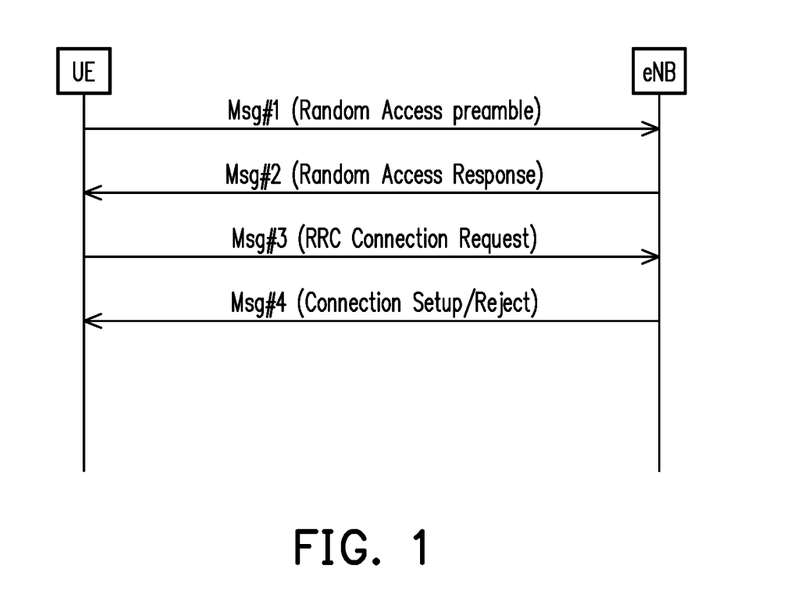
FIG. 1 illustrates a legacy 4 step RACH procedure for setting up a connection between a UE and an eNB.

Traditionally, in order for a UE such as a mobile phone to connect to a base station, the UE would perform a random access (RA) procedure through a random access channel (RACH). Once the RA procedure has been successful, the UE may subsequently perform a radio resource control (RRC) connection procedure to transmit or receive payload. The above described RA procedure for setting up a connection between a UE and an eNB is shown in FIG. 1 which includes the conventional 4 message steps that are typical in legacy communication systems. By exchanging a series of messages that are shown in FIG. 1, a UE may connect to an eNB in a radio access network if the RA procedures are successful.

Referring to FIG. 1, first, a UE may initiate the RA procedure to connect to the eNB by transmitting Msg #1 which includes a randomly selected random access preamble (RAP). Upon receiving the RAP, an eNB would respond by transmitting to the UE an Msg #2 which includes a random access response (RAR). Next, after receiving the RAR which may contain an uplink grant to indicate a physical resource to be used for an uplink transmission, the UE may transmit Msg #3, which may include an RRC Connection Request located in the uplink grant resource indicated in RAR. If multiple UEs happen to simultaneously transmit the same RAP at the same RACH, multiple RRC Connection Request messages corresponding to the same RAP will be transmitted to the eNB. Therefore the eNB would need to resolve the contention. The winner of the contention would typically be based on one or more factors such as the power level. The eNB would transmit Msg #4 which indicates whether the UE would be able to be connected to the eNB. By receiving Msg #4 which includes Connection Setup/Reject to the UE, the UE would know whether the RA attempt has succeeded or failed. If the UE has failed the contention, the UE may select a different RAP and transmit Msg #1 once more.

Figure 2:
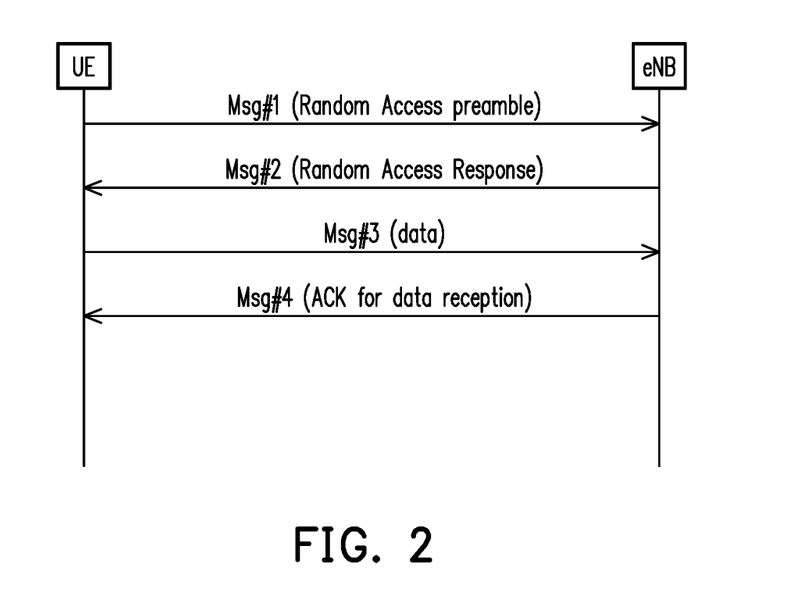
FIG. 2 illustrates an early data transmission (EDT) via a legacy 4 step RACH procedure for transmitting small data between a UE and an eNB.

Presently, as the Internet of things (IoT) and machine type communication (MTC) devices become increasingly popular, MTC devices such as smart meters would transmit small data which may have, for example, just a few kilobytes of data. Under such usage, it is wasteful for MTC devices to establish a traditional RA procedure followed by an RRC connection procedure. For transmitting small data, a modified 4 step procedure for transmitting small data between a UE and an eNB is shown in FIG. 2. One way to prevent MTC devices from wastefully performing the RRC connection procedure is to transmit the payload (small data) in the Msg #3 message. However, such modified procedure is not without additional difficulties.

Assuming that the payload is way too large to be carried in Msg #3, then the UE would not be allowed to transmit the payload within the four steps procedure but would instead wait until the RRC connection procedure is complete before transmitting the payload. If the payload is not too large but cannot be completed in one try, then the payload can be split into multiple fragments and be transmitted by using multiple Msg #1~Msg #4 RA procedures in repetition. Multiple repetitions of such transmissions will result in inefficiency because superfluous signaling exchanges during RA contention may not be avoided for each RA procedure. After performing RA contentions, a MTC device may not guaranteed to have a successful contention result. The MTC device may fail during the contention phase (i.e. Msg #3) and have to re-transmit Msg #1 once more. Therefore, another modified RA procedure for a UE to connect to an eNB and related apparatuses using the modified RA procedure will be provided.

SUMMARY OF THE DISCLOSURE

Accordingly, the present disclosure is directed to an extended RA method used by a UE and a base station, and related apparatuses using the same method.

In an aspect, the disclosure is directed to an extended RA method used by a base station, and the method would include not limited to: receiving a random access preamble (RAP); transmitting a random access response (RAR) which responds to the RAP; receiving an RA request signal which corresponds to the RAR and includes a first small data and a piggyback indicator which indicates whether there is a second small data to be received; and transmitting an RA request acknowledgment signal which corresponds to the RA request signal and includes an uplink grant which indicates a resource for the second small data.

In an aspect, the disclosure is directed to a base station which includes not limited to a hardware receiver; a hardware transmitter; and a hardware processor coupled to the hardware transmitter and the hardware receiver and configured to receive, via the receiver, a random access preamble (RAP); transmit, via the transmitter, a random access response (RAR) which responds to the RAP; receive, via the receiver, an RA request signal which corresponds to the RAR and comprises a small data and a piggyback indicator which indicates whether there is a second small data to be received; and transmit, via the transmitter, an RA request acknowledgment signal which corresponds to the RA request signal and comprises an uplink grant which indicates a resource for the second small data.

In an aspect, the disclosure is directed to an extended RA method used by a UE, and the method would include not limited to transmitting a random access preamble (RAP); receiving a random access response (RAR) which responds to the RAP; transmitting an RA request signal which corresponds to the RAR and comprises a first small data and a piggyback indicator which indicates whether there is a second small data to be transmitted; and receiving an RA request acknowledgment signal which corresponds to the RA request signal and comprises an uplink grant which indicates a resource for the second small data.

In an aspect, the disclosure is directed to a UE which would include not limited to a hardware receiver; a hardware transmitter; and a hardware processor coupled to the hardware transmitter and the hardware receiver and configured to transmit, via the transmitter, a random access preamble (RAP); receive, via the receiver, a random access response (RAR) which responds to the RAP; transmit, via the transmitter, an RA request signal which corresponds to the RAR and comprises a first small data and a piggyback indicator which indicates whether there is a second small data to be transmitted; and receive, via the receiver, an RA request acknowledgment signal which corresponds to the RA request signal and comprises an uplink grant which indicates a resource for the second small data.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the present exemplary embodiments of the disclosure, examples of which are illustrated in the accompanying drawings. Wherever possible, the same reference numbers are used in the drawings and the description to refer to the same or like parts.

To overcome the above described problem, the disclosure proposes a piggyback indicator which indicates whether there will still be small data left to be transmitted. The piggyback indicator may be located in an information element (IE) in Msg #3 of FIG. 1 and FIG. 2. By receiving the piggyback indicator, an eNB may allocate resources accordingly. The disclosure further provides three exemplary embodiments which provides more information for the small data to be transmitted and resources to be granted.

The disclosure is directed to a modified extended RA procedure used by an eNB and a UE, and the modified procedure is designed to save signaling overhead when transmitting small data by devices not limited to MTC devices such as smart meters. In particular, this disclosure utilizes a piggyback indicator in Msg #3 to indicates whether there maybe additional payloads in another iteration of Msg #3~Msg #4. If there are additional payloads, an uplink grant will accompany Msg #4 to indicate the location and time of a resource to uplink the payload. Other information can be introduced in Msg #3 and Msg #4 to further indicate the nature of information to be transmitted and the resources required for transmission.

Figure 3:
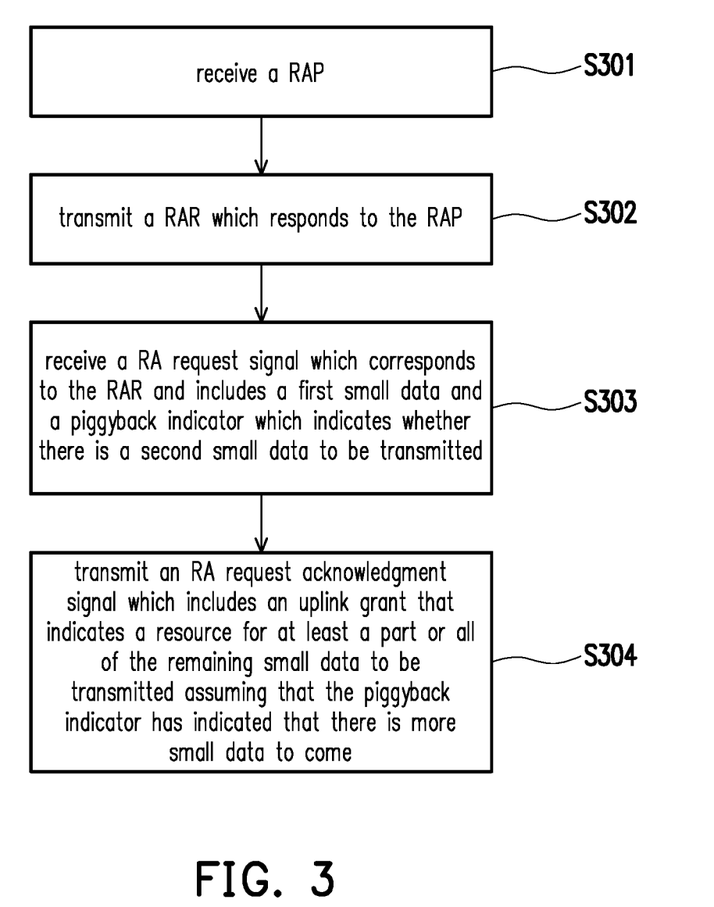
FIG. 3 illustrates steps of an extended RA procedure from the perspective of a base station in accordance with one of the exemplary embodiments of the disclosure.

FIG. 3 illustrates steps of an extended RA procedure from the perspective of a base station in accordance with one of the exemplary embodiments of the disclosure. In step S301, the base station would receive an RAP (Msg #1). In step S302, after receiving the RAP, the base station would transmit an RAR (Msg #2) to respond to the RAP. In step S303, the base station would receive an RA request signal (Msg #3) which includes a first small data and a piggyback indicator which indicates whether there is a second small data to be transmitted. In step S304, the base station would transmit an RA request acknowledgment signal (Msg #4) which includes an uplink grant that indicates a resource for at least a part or all of the remaining small data to be transmitted assuming that the piggyback indicator has indicated that there is more small data to come.

In one of the exemplary embodiments, in response to the piggyback indicator indicating a first binary value, the second small data is to be received in the resource indicated by the uplink grant.

In one of the exemplary embodiments, in response to the piggyback indicator indicating the first binary value, the second small data is to be received in the resource indicated by the uplink grant at least by receiving another RA request signal which comprises the second small data without requiring another RAP and another RAR prior to another RA request signal.

In one of the exemplary embodiments, in response to the piggyback indicator indicating a second binary value, the second small data will not be received.

In one of the exemplary embodiments, the RA request signal further includes a buffer status report (BSR) which indicates a size of the second small data.

In one of the exemplary embodiments, wherein the uplink grant further indicates that a physical uplink shared channel (PUSCH) is allocated for receiving the second small data.

In one of the exemplary embodiments, in response to receiving the first small data, transmitting an acknowledgement which is embedded in the RA request acknowledgment signal for indicating that the first small data has been received.

In one of the exemplary embodiments, the RA request signal further including a power head room (PHR) report to indicate a remaining power budget for transmitting the second small data. PHR is used to indicates the difference between the UE's maximum transmission power and the estimated power for last uplink transmission.

In one of the exemplary embodiments, in response to receiving the RA request signal which includes the PHR, steps of the UE further including adjusting a modulation and coding scheme (MCS) based on the PHR, and the MCS is embedded within another RA request acknowledgment signal.

Figure 4:
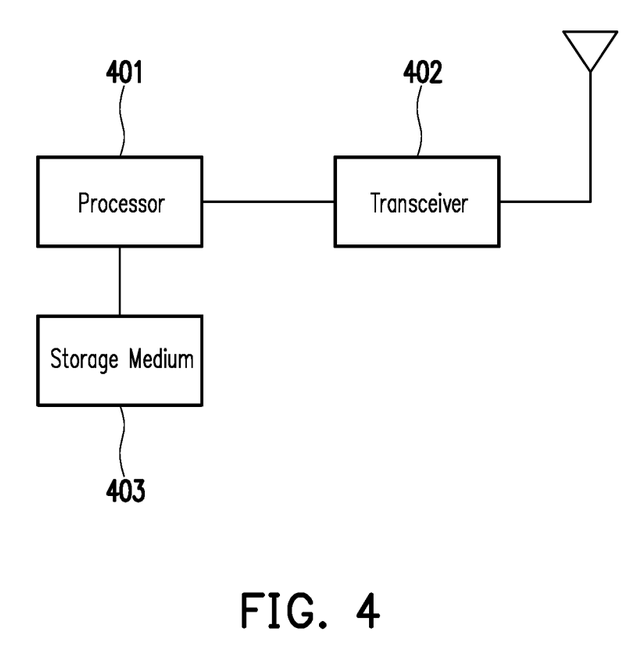
FIG. 4 illustrates a hardware block diagram of a base station in accordance with one of the exemplary embodiments of the disclosure.

FIG. 4 illustrates a hardware block diagram of a base station in accordance with one of the exemplary embodiments of the disclosure. The term base station in this disclosure maybe a variation or a variation or an advanced version of a 5G base station, a gNB, a macro cell base station, micro cell base station, pico cell base station, femto cell base station, "eNodeB" (eNB), a Node-B, an advanced base station (ABS), a base transceiver system (BTS), an access point, a home base station, a relay station, a scatterer, a repeater, an intermediate node, an intermediary, satellite-based communication base stations, and so forth.

The base station may include not limited to a hardware processor 401 electrically connected to a transceiver 402 and a non-transitory storage medium 403. The hardware processor 401 is electrically connected to the hardware transceiver 402 and configured at least for implementing the method of FIG. 3 as well as its exemplary embodiments and alternative variations. The hardware transceiver 402 may include one or more separate or integrated transmitter(s) and receiver(s) configured to transmit and receive signals respectively in the radio frequency or in the mmWave frequency. The hardware transceiver 402 may also perform operations such as low noise amplifying, impedance matching, frequency mixing, up or down frequency conversion, filtering, amplifying, and so forth. The hardware transceiver 402 may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceiver 402 may further include an antenna array which may include one or multiple antennas to transmit and receive omni-directional antenna beams or directional antenna beams.

The hardware processor 401 is configured to process digital signals and to perform procedures of the proposed extended RA method in accordance with the proposed exemplary embodiments of the disclosure. The hardware processor 401 may be implemented by using programmable units such as a micro-processor, a micro-controller, a DSP chips, FPGA, etc. The functions of the hardware processor 401 may also be implemented with separate electronic devices or ICs. It should be noted that the functions of hardware processor 401 may be implemented with either hardware or software.

Figure 5:
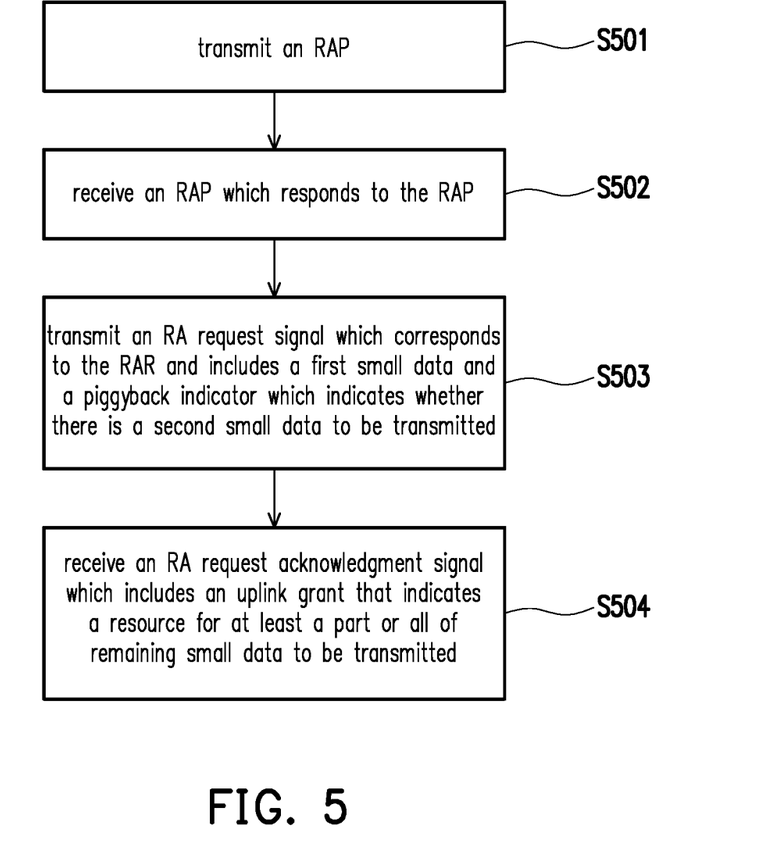
FIG. 5 illustrates steps of an extended RA procedure from the perspective of a UE in accordance with one of the exemplary embodiments of the disclosure.

FIG. 5 illustrates steps of an extended RA procedure from the perspective of a UE in accordance with one of the exemplary embodiments of the disclosure. In step S501, the UE would transmit an RAP (Msg #1). In step S502, after transmitting the RAP (Msg #2), the UE would receive an RAR which responds to the RAP. In step S503, the UE would transmit an RA request signal (Msg #3) which includes a first small data and a piggyback indicator which indicates whether there is a second small data to be transmitted. In step S504, the UE would receive an RA request acknowledgment signal (Msg #4) which includes an uplink grant that indicates a resource for at least a part or all of remaining small data to be transmitted.

In one of the exemplary embodiments, in response to the piggyback indicator indicating a first binary value, the second small data is to be transmitted in the resource indicated by the uplink grant.

In one of the exemplary embodiments, in response to the piggyback indicator indicating the first binary value, the second small data is to be transmitted in the resource indicated by the uplink grant including: transmitting another RA request signal which includes the second small data without requiring another RAP and another RAR prior to the another RA request signal; and receiving another RA request acknowledgment signal which includes the uplink grant which indicates the resource for the second small data to be transmitted.

In one of the exemplary embodiments, in response to the piggyback indicator indicating a second binary value, the second small data will not be transmitted.

In one of the exemplary embodiments, the RA request signal further includes a BSR which indicates a size of the second small data.

In one of the exemplary embodiments, the uplink grant further indicates that a PUSCH is allocated for transmitting the second small data.

In one of the exemplary embodiments, in response to transmitting the first small data, receiving an acknowledgement in the RA request acknowledgment signal for indicating that the first small data has been received.

In one of the exemplary embodiments, the RA request signal further includes a PHR to indicate a remaining power needed for transmitting the second small data.

In one of the exemplary embodiments, in response to transmitting the RA request signal comprising the PHR, the RA request acknowledgment signal further includes an MCS based on the PHR.

Figure 6:
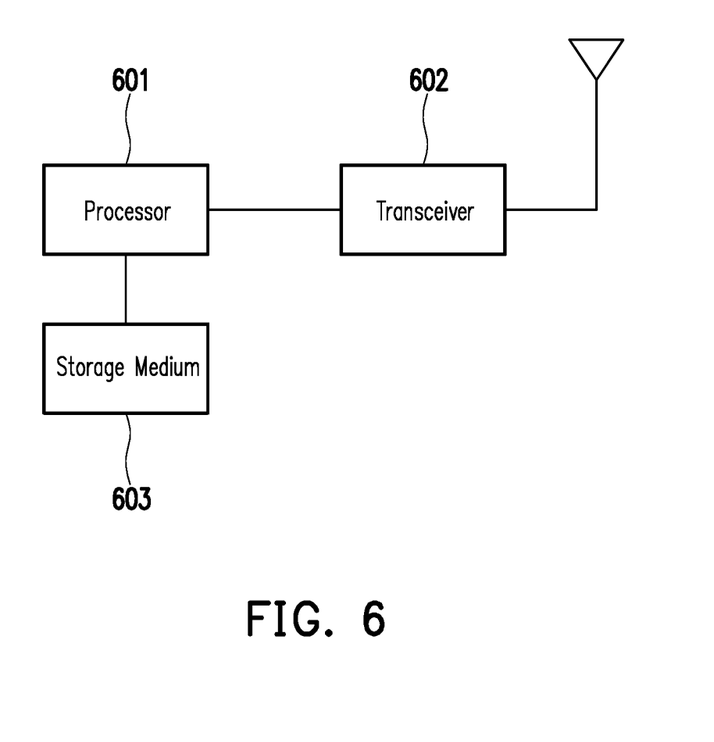
FIG. 6 illustrates a hardware block diagram of a UE in accordance with one of the exemplary embodiments of the disclosure.

FIG. 6 illustrates a hardware block diagram of a user equipment in accordance with one of the exemplary embodiments of the disclosure. The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

The UE may include not limited to a hardware processor 601 electrically connected to a transceiver 602 and a non-transitory storage medium 603. The hardware processor 601 is electrically connected to the transceiver 602 and a non-transitory storage medium 603. The hardware processor 601 is configured at least for implementing the method of FIG. 5 as well as its exemplary embodiments and alternative variations. The hardware transceiver 602 may include one or more separate or integrated transmitter(s) and receiver(s) configured to transmit and receive signals respectively in the radio frequency or in the mmWave frequency. The hardware transceiver 602 may also perform operations such as low noise amplifying, impedance matching, frequency mixing, up or down frequency conversion, filtering, amplifying, and so forth. The hardware transceiver 602 may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceiver 602 may further include an antenna array which may include one or multiple antennas to transmit and receive omni-directional antenna beams or directional antenna beams.

The hardware processor 601 is configured to process digital signals and to perform procedures of the proposed extended RA method in accordance with the proposed exemplary embodiments of the disclosure. The hardware processor 601 may be implemented by using programmable units such as a micro-processor, a micro-controller, a DSP chips, FPGA, etc. The functions of the hardware processor 601 may also be implemented with separate electronic devices or ICs. It should be noted that the functions of hardware processor 601 may be implemented with either hardware or software.

To further elucidate the above described concepts, the disclosure provides three exemplary embodiments. For the first exemplary embodiment, the piggyback indicator is added to the conventional Msg #3 to indicate whether there is still small data left to be transmitted. Also, the UL grant is added to the conventional Msg #4 to indicate resources for least a part of the remaining small data left to be transmitted. For the second exemplary embodiment, in addition to the first exemplary embodiment, a buffer status report is transmitted from the UE to the base station so that the base station would know the size of remaining small data and thus may allocate further resources if necessary. For the third exemplary embodiment, in addition to the first and second exemplary embodiment, the convention Msg #3 may further add a PHR to allow the base station may adjust the modulation and coding scheme (MCS) accordingly. The new MCS would be added to the conventional Msg #4.

Figure 7:
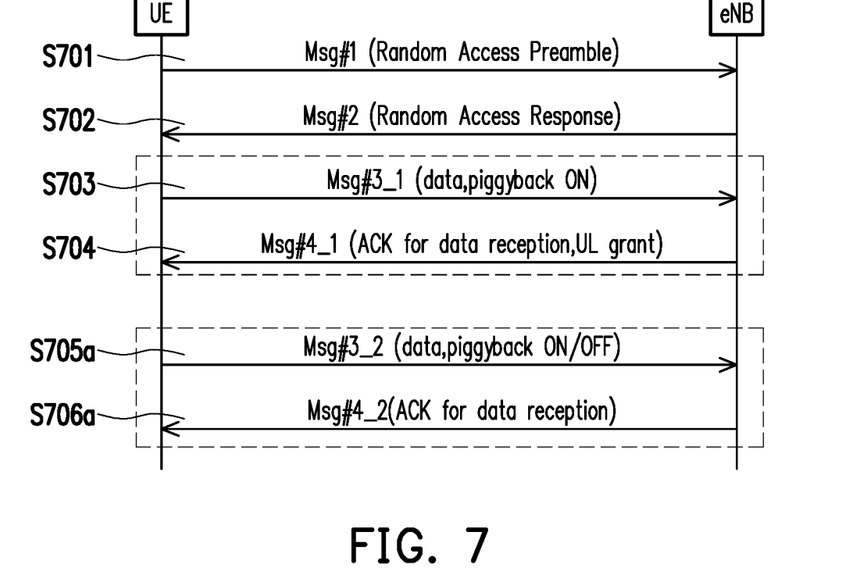
FIG. 7 illustrates a first exemplary embodiment of the proposed extended RA procedure in accordance with one of the exemplary embodiments of the disclosure.

FIG. 7 illustrates a first exemplary embodiment of the proposed extended RA procedure in accordance with one of the exemplary embodiments of the disclosure. In step S701, the UE would transmit an RAP (i.e. Msg #1) via an RACH to an eNB. In step S702, the eNB would respond to the RAP by transmitting an RAR (i.e. Msg #2) to the UE. In step S703, the UE would transmit an RA request message which is shown as Msg #3_1 in FIG. 7. The Msg #3_1 would include not limit to a small data (e.g. user payload data of a small size that is typical for the current industry standard) and a piggyback indicator. The piggyback indicator would indicate whether there is still any more small data left to be transmitted. If the capacity of Msg #3_1 is not large enough to accommodate the entirety of the small data to be transmitted, the piggyback indicator will indicate that there will be another iteration of Msg #3, Msg #4 to be exchanged. Under such circumstance, another iteration of Msg #1 and Msg #2 maybe redundant and therefore not needed. Upon receiving the piggyback indicator, the eNB will allocate resources accordingly. In Msg #3_1, piggyback indicator indicates "ON" (e.g. binary value '1') means that there is still small data or payload to be transmitted thus another iteration of Msg #3, Msg #4 will be exchanged without requiring another iteration of Msg #1, Msg #2 to be exchanged. Otherwise, if the piggyback indicator indicates "OFF" (e.g. binary value '0'), it means that there is no more small data payload to be transmitted thus there will not be another iteration of Msg #3~Msg #4.

In step S704, the eNB would transmit an RA acknowledgment message (Msg #4_1 in FIG. 7) to the UE. The UL grant in Msg #4_1 would indicate the physical resource in terms of time slot, frequency, frequency block, or a specific channel, to transmit at least a part of the remaining small data to the eNB. Assuming that, the piggyback indicator has indicated 'ON", then in step S705*a*, the UE would transmit another iteration of RA request (Msg #3_2) to the eNB. The Msg #3_2 would include at least another portion of the remaining data and the piggyback indicator. Also, in step S705*b*, the UE would receive from the eNB another iteration of RA request acknowledgment which would include an acknowledgment to indicate whether the another portion of the remaining data has received or not. Assuming that in Msg #3_2 that the piggyback indicator has indicated "OFF", then there would not be another iteration of RA request and RA request acknowledgment messages. In other words, there won't be another set of Msg #3_3 and Msg #4_3 messages. It is worth noting that whenever RA request and RA request acknowledgment messages are repeated to transmit portions of small data, RAP and RAR are not needed and thus signaling overhead and data transmission delay can be reduced.

Figure 8:
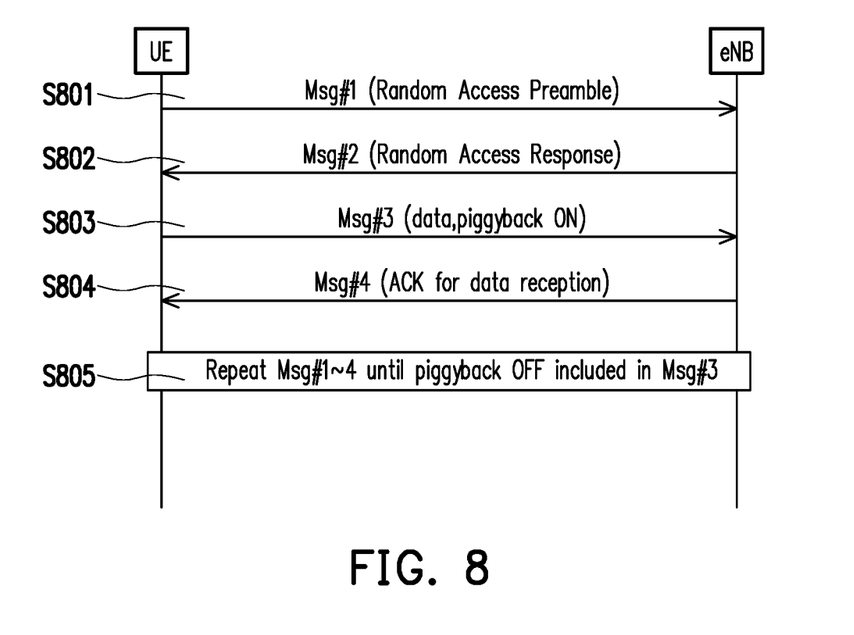
FIG. 8 illustrates an alternative variation of a first exemplary embodiment of the proposed extended RA procedure in accordance with one of the exemplary embodiments of the disclosure.

FIG. 8 illustrates an alternative variation of a first exemplary embodiment of the proposed extended RA procedure in accordance with one of the exemplary embodiments of the disclosure. For this variation, steps S801~S804 are almost identical to steps S701~S704 of FIG. 7 except that Msg #4 in step S804 does not include an UL grant. However, in step S805, iterations of Msg #1~Msg #4 are repeated until the very last piggyback indicator in the last Msg #3 has indicated an 'OFF. In in Msg #3 that the piggyback indicator indicates 'ON', it means there is still small data or payload to be transmitted and then another iteration of Msg #1~Msg #4 will be exchanged until piggyback indicator indicates 'OFF' in Msg #3. The piggyback indicator indicates 'OFF' means there is no more small data payload to be transmitted thus there will not be another iteration of Msg #1~Msg #4. This means that for this exemplary embodiment, RAP and RAR will be repeated in all iterations until there is no more small data left to be transmitted.

Figure 9:
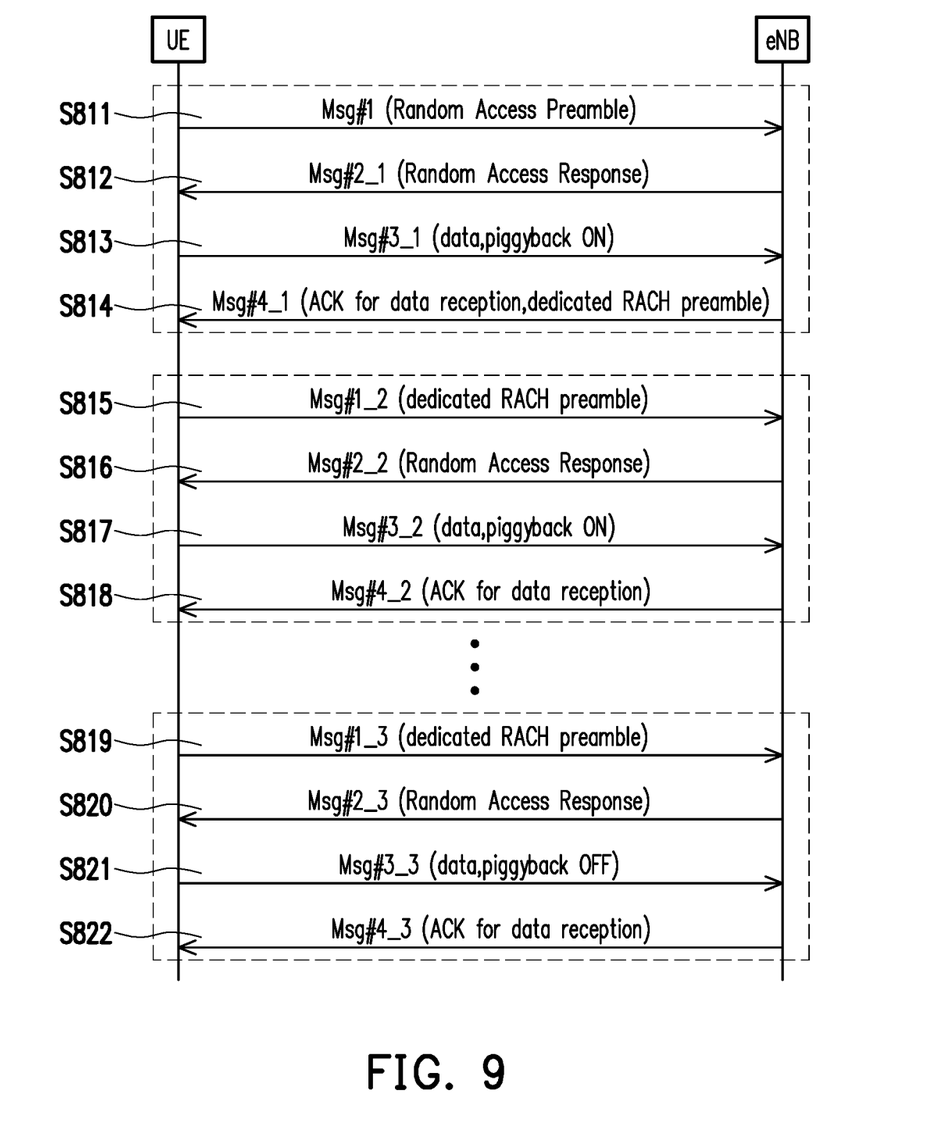
FIG. 9 illustrates an alternative variation of a first exemplary embodiment of the proposed extended RA procedure with contention-free random access (CFRA) procedure in accordance with one of the exemplary embodiments of the disclosure.

FIG. 9 illustrates another alternative variation of a first exemplary embodiment of the proposed extended RA procedure in accordance with one of the exemplary embodiments of the disclosure. For this variation, steps S811~S814 are almost identical to steps S701~S704 of FIG. 7 except that Msg #4_1 in step S814 include a dedicated RACH preamble which functions as an UL grant if piggyback indicator indicates "ON" in step S813. Then steps S815~S818 are another iteration of steps S811~S814 by using the dedicated RACH preamble in Msg #1_2 of step S815 to perform a CFRA procedure. Since Msg #3_2 indicates 'ON', another iteration is still needed to complete transmitting the payload. Steps S819~S822 would be the last iteration since the last piggyback indicator in the latest Msg #3_3 as in step S821 has indicated an 'OFF'. It is worth nothing that a CFRA procedure is a variation of a RA procedure which does not involve contention and resolution such as Msg #3 and Msg #3 of FIG. 1 respectively.

Figure 10:
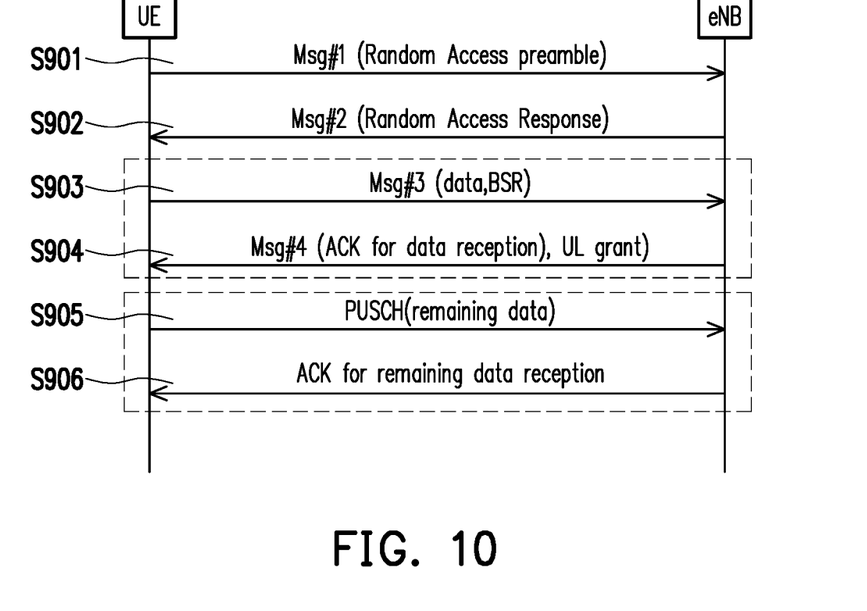
FIG. 10 illustrates a second exemplary embodiment of the proposed extended RA procedure in accordance with one of the exemplary embodiments of the disclosure.

FIG. 10 illustrates a second exemplary embodiment of the proposed extended RA procedure in accordance with one of the exemplary embodiments of the disclosure. For this exemplary embodiment, steps S901~S902 are identical to steps S701~S702 and also identical to steps S801~S802, respectively. In step S903, the RA request message would include a small data and further include a BSR which would indicate the size of the payload to be transmitted. Upon receiving BSR, the eNB would know how to allocate physical resources for the upcoming UL grant based on the received BSR. In step S904, the eNB would transmit the RA request acknowledgment to the UE. The RA request acknowledgment would include the acknowledgment which indicates that the small data has been received and also an UL grant for a remaining portion of the small data yet to be received. Assuming that the UL grant has indicated that a PUSCH is to be used for transmitting the remaining portion(s) of the small data, then in step S905, the UE would transmit the remaining portion(s) of the small data via the PUSCH as previously indicated. In step S906, the eNB would transmit an acknowledgment message to indicate whether the remaining portion(s) of the small data via the PUSCH has been received.

For the second exemplary embodiment, it is worth noting that the UL grant would likely indicate that a PUSCH will be used to transmit the remaining data, and then when the remaining data are indeed received through PUSCH, an acknowledgment will be transmitted by the eNB. However, since the buffer size is known in advance, and if the BSR has indicated that a buffer overflow would likely occur, then the eNB would indicate that the traditional RRC connection should be used instead of the transmission through PUSCH.

Figure 11:
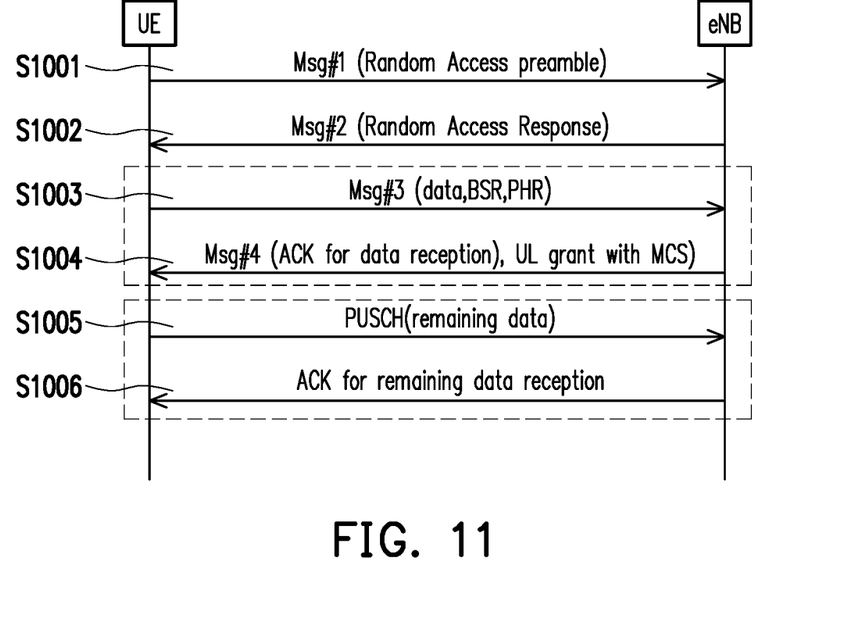
FIG. 11 illustrates a third exemplary embodiment of the proposed extended RA procedure in accordance with one of the exemplary embodiments of the disclosure.

FIG. 11 illustrates a third exemplary embodiment of the proposed extended RA procedure in accordance with one of the exemplary embodiments of the disclosure. For this exemplary embodiment, S1001, S1002, S1005, and S1006 are identical to steps S901, S902, S905, and S906. However, in addition to first and second exemplary embodiments, step 1003 may further include a PHR to indicate the difference between the UE's maximum transmission power and the estimated power for last uplink transmission. Upon receiving the RA request (i.e. Msg #3), the eNB would be able to allocate the resources accordingly and also inform the user device the MCS (e.g. QPSK, 16QAM, 64, QAM) to be used to transmit the remaining small data. The MCS being used can affect efficiency of the small data transmission. For example, if power constraint is an issue, a MCS that has a higher coding rate may be used in conjunction with lower power to increase the efficiency of transmission or reduce power consumption.

In view of the aforementioned descriptions, the present disclosure is suitable for being used in a wireless communication system during a random access phase and is able to reduce signaling overhead and to increase power efficiency of a UE and a base station.

No element, act, or instruction used in the detailed description of disclosed embodiments of the present application should be construed as absolutely critical or essential to the present disclosure unless explicitly described as such. Also, as used herein, each of the indefinite articles "a" and "an" may include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An extended random access (RA) method used by a base station, the method comprising:
   receiving a random access preamble (RAP);
   transmitting a random access response (RAR) which responds to the RAP;
   receiving an RA request signal which corresponds to the RAR and comprises a first early data transmission and a piggyback indicator with a first binary value which indicates a second early data transmission to be received; and
   transmitting an RA request acknowledgment signal which corresponds to the RA request signal and comprises an uplink grant which indicates a resource for the second early data transmission,
   wherein in response to the piggyback indicator indicating the first binary value, the second early data transmission is to be received in the resource indicated by the uplink grant at least by receiving another RA request signal which comprises the second early data transmission without requiring another RAP and another RAR prior to the another RA request signal.

2. The method of claim 1, wherein the RA request signal further comprises a buffer status report (BSR) which indicates a size of the second early data transmission.

3. The method of claim 1, wherein the uplink grant further indicates that a physical uplink shared channel (PUSCH) is allocated for receiving the second early data transmission.

4. The method of claim 1 further comprising:
   in response to receiving the first small data, transmitting an acknowledgement which is embedded in the RA request acknowledgment signal for indicating that the first early data transmission has been received.

5. The method of claim 1, wherein the RA request signal further comprising a power headroom (PHR) report to indicates a remaining power budget for transmitting the second early data transmission.

6. The method of claim 5, wherein in response to receiving the RA request signal comprising the PHR, further comprising:
   adjusting a modulation and coding scheme (MCS) based on the PHR, and the MCS is embedded within another RA request acknowledgment signal.

7. A base station comprising:
   a hardware receiver;
   a hardware transmitter; and
   a hardware processor coupled to the hardware transmitter and the hardware receiver and configured to:
     receive, via the receiver, a random access preamble (RAP);
     transmit, via the transmitter, a random access response (RAR) which responds to the RAP;
     receive, via the receiver, an RA request signal which corresponds to the RAR and comprises a first early data transmission and a piggyback indicator with a first binary value which indicates a second early data transmission to be received; and
     transmit, via the transmitter, an RA request acknowledgment signal which corresponds to the RA request signal and comprises an uplink grant which indicates a resource for the second early data transmission,
     wherein in response to the piggyback indicator indicating the first binary value, the second early data transmission is to be received in the resource indicated by the uplink grant at least by receiving another RA request signal which comprises the second early data transmission without requiring another RAP and another RAR prior to the another RA request signal.

8. An extended random access (RA) method used by a user equipment (UE), the method comprising:
   transmitting a random access preamble (RAP);
   receiving a random access response (RAR) which responds to the RAP;
   transmitting an RA request signal which corresponds to the RAR and comprises a first early data transmission and a piggyback indicator with a first binary value which indicates a second early data transmission to be transmitted; and
   receiving an RA request acknowledgment signal which corresponds to the RA request signal and comprises an uplink grant which indicates a resource for the second early data transmission,
   wherein in response to the piggyback indicator indicating the first binary value, the second early data transmission is to be transmitted in the resource indicated by the uplink grant by transmitting another RA request signal which comprises the second early data transmission without requiring another RAP and another RAR prior to the another RA request signal and by receiving another RA request acknowledgment signal which comprises the uplink grant which indicates the resource for the second early data transmission to be transmitted.

9. The method of claim 8, wherein the RA request signal further comprising a buffer status report (BSR) which indicates a size of the second early data transmission.

10. The method of claim 8, wherein the uplink grant further indicates that a physical uplink shared channel (PUSCH) is allocated for transmitting the second early data transmission.

11. The method of claim 10 further comprising:
   in response to transmitting the first early data transmission, receiving an acknowledgement in the RA request acknowledgment signal for indicating that the first early data transmission has been received.

12. The method of claim 11, wherein the RA request signal further comprising a power headroom report (PHR) to indicates a remaining power budget for transmitting the second early data transmission.

13. The method of claim 12, wherein in response to transmitting the RA request signal comprising the PHR, the RA request acknowledgment signal further comprises an adjusted modulation and coding scheme (MCS) based on the PHR.

14. A user equipment comprising:
   a hardware receiver;
   a hardware transmitter; and
   a hardware processor coupled to the hardware transmitter and the hardware receiver and configured to:
   transmit, via the transmitter, a random access preamble (RAP);
   receive, via the receiver, a random access response (RAR) which responds to the RAP;
   transmit, via the transmitter, an RA request signal which corresponds to the RAR and comprises a first early data transmission and a piggyback indicator with a first binary value which indicates a second early data transmission to be transmitted; and
   receive, via the receiver, an RA request acknowledgment signal which corresponds to the RA request signal and comprises an uplink grant which indicates a resource for the second early data transmission wherein in response to the piggyback indicator indicating the first binary value, the second early data transmission is to be transmitted in the resource indicated by the uplink grant by transmitting another RA request signal which comprises the second small data early data transmission without requiring another RAP and another RAR prior to the another RA request signal and by receiving another RA request acknowledgment signal which comprises the uplink grant which indicates the resource for the second small data early data transmission to be transmitted.

\* \* \* \* \*